United States Patent [19]
Kårdén et al.

[11] 3,845,673
[45] Nov. 5, 1974

[54] NUT RUNNER WITH PRESSURE MEANS TO HOLD TORQUE CLUTCH MEMBER DISENGAGED

[75] Inventors: Karl Gösta Kårdén, Nacka; Sven Peter Johas Westerberg, Saltsjo-Boo; Klas Johan Åström, Danderyd, all of Sweden

[73] Assignee: Atlas Copco Aktiebolag, Nacka, Sweden

[22] Filed: Mar. 29, 1973

[21] Appl. No.: 346,109

[30] Foreign Application Priority Data
Apr. 4, 1972  Sweden.............................. 4308/72

[52] U.S. Cl.................. 74/751, 81/52.4 R, 173/12, 192/56 F
[51] Int. Cl... F16h 3/74, F16d 43/286, B25b 23/14
[58] Field of Search............ 74/751; 192/56 F, .034; 81/52.4 R, 52.4 A; 173/12

[56] References Cited
UNITED STATES PATENTS
3,696,871  10/1972  Stenbacka.......................... 173/12
3,739,659  6/1973  Workman, Jr. ...................... 74/751

Primary Examiner—Samuel Scott
Assistant Examiner—J. Reep
Attorney, Agent, or Firm—Flynn & Frishauf

[57] ABSTRACT

A two-speed nut runner has a low torque clutch that disengages due to being overloaded at a predetermined torque. A one-way clutch automatically takes over the transmission of torque at a lower speed and higher torque and the low torque clutch is held in a fully released position by means of a piston that is placed inside the output shaft of the nut runner.

11 Claims, 3 Drawing Figures

NUT RUNNER WITH PRESSURE MEANS TO HOLD TORQUE CLUTCH MEMBER DISENGAGED

This invention relates to a nut runner having an output shaft connected to be rotated by a fluid motor on the one hand through a low torque clutch of the kind that disengages when the torque transmitted therethrough reaches a pre-determined value and on the other hand through a gearing and a one-way clutch that automatically takes over the transmission of torque when the low torque clutch disengages, said low torque clutch comprising a driving clutch member connected to co-rotate with a driving shaft and a driven clutch member connected to co-rotate with said output shaft, one of said clutch members being axially movable relative to its associated shaft between a position in which it is engaged with the other of the clutch members and a disengaged position.

In a prior nut runner of this kind, the low torque clutch ratchets all the time the one-way clutch transmits torque, which causes noise and wear and reduces the maximum torque. It is an object of the invention to provide a nut runner of the kind referred to, in which the low torque clutch is retained in a completely disengaged condition once it disengages. The invention has been given the characteristics stated in the claims.

BRIEF DESCRIPTION OF THE DRAWINGS

The invention will be further described with reference to the accompanying drawings which show by way of example a nut runner according to the invention.

FIG. 3, finally, is a fragmentary cross section along the line 3—3 in FIG. 2.

DETAILED DESCRIPTION OF ILLUSTRATED EMBODIMENTS

Figure 1:
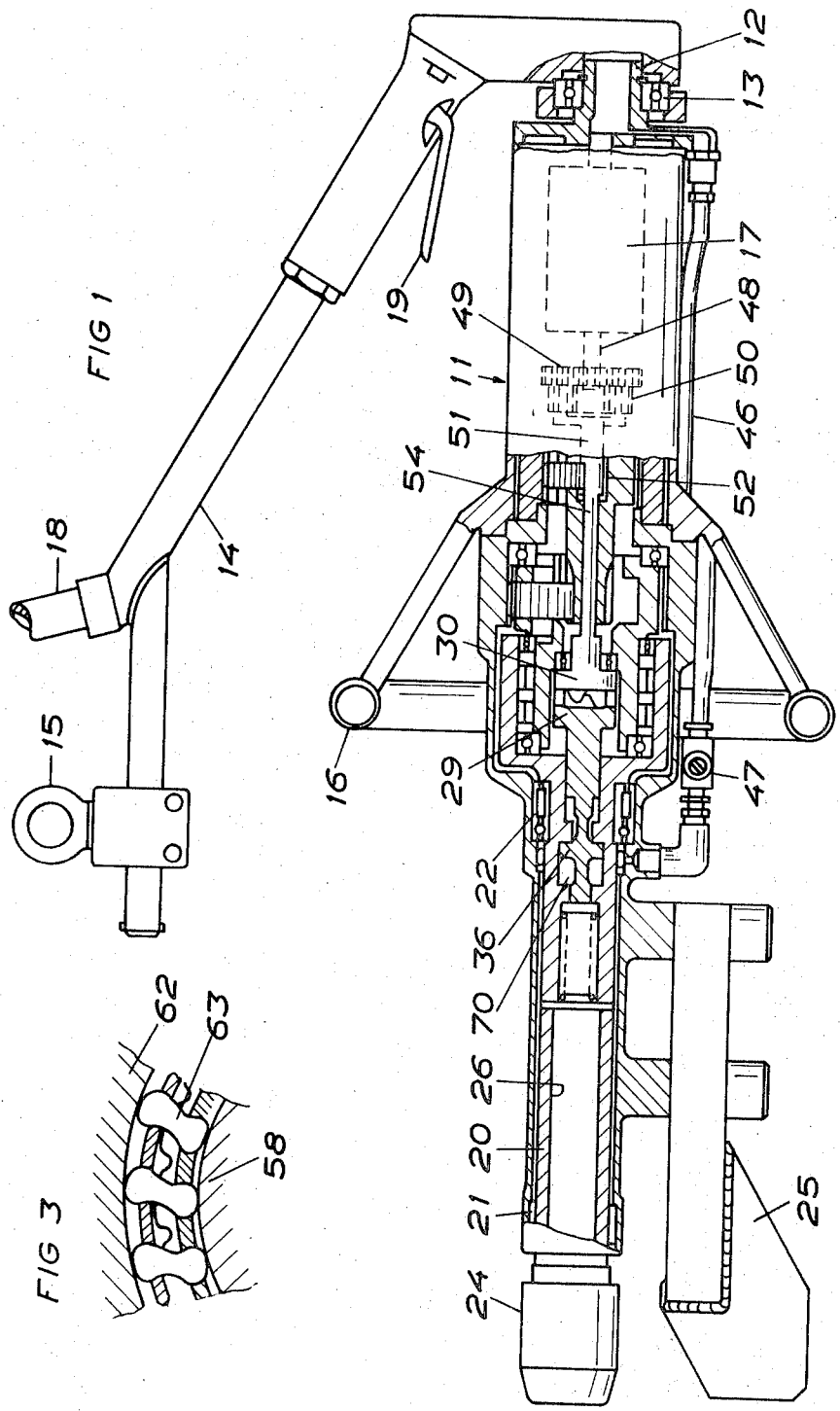
FIG. 1 is a longitudinal view, partly in section, of the nut runner.

The nut runner shown in the figures has a housing 11 which is rotatably carried in a suspender arm 14 by means of a backward directed trunnion 12 and a bearing 13. The suspender arm has a ring 15 by means of which the nut runner can be suspended in a balance hoist which is not illustrated. Another ring 16 is to be used as a handle. Compressed air is supplied to the air motor 17 of the nut runner through a hose 18 and it is conveyed through a supply valve 19 — illustrated by its trigger — in the arm 14 and through the trunnion 12 to the motor 17 which preferably is a sliding vane motor. An O-ring provides a seal between the trunnion 12 and the arm 14. An output shaft 20 is rotatably journalled by means of a needle bearing 21 and a needle-and-ball bearing 22 in the housing 11, and a socket 24 for a nut can be attached to the shaft 20. In use, the reaction torque is taken up by means of a reaction torque element 25 that is screwed to the housing 11. The output shaft 20 has a through bore 26 and its back end has internal splines 27 as well as external splines 28 as can be seen from FIG. 2. (FIG. 1 is schematically shown and only some details have been provided with reference numerals). A low torque clutch comprises a driven clutch member 29 and a driving clutch member 30, both of which are provided with four dogs 31 and 32, respectively, which have inclined interfacing surfaces.

Figure 2:
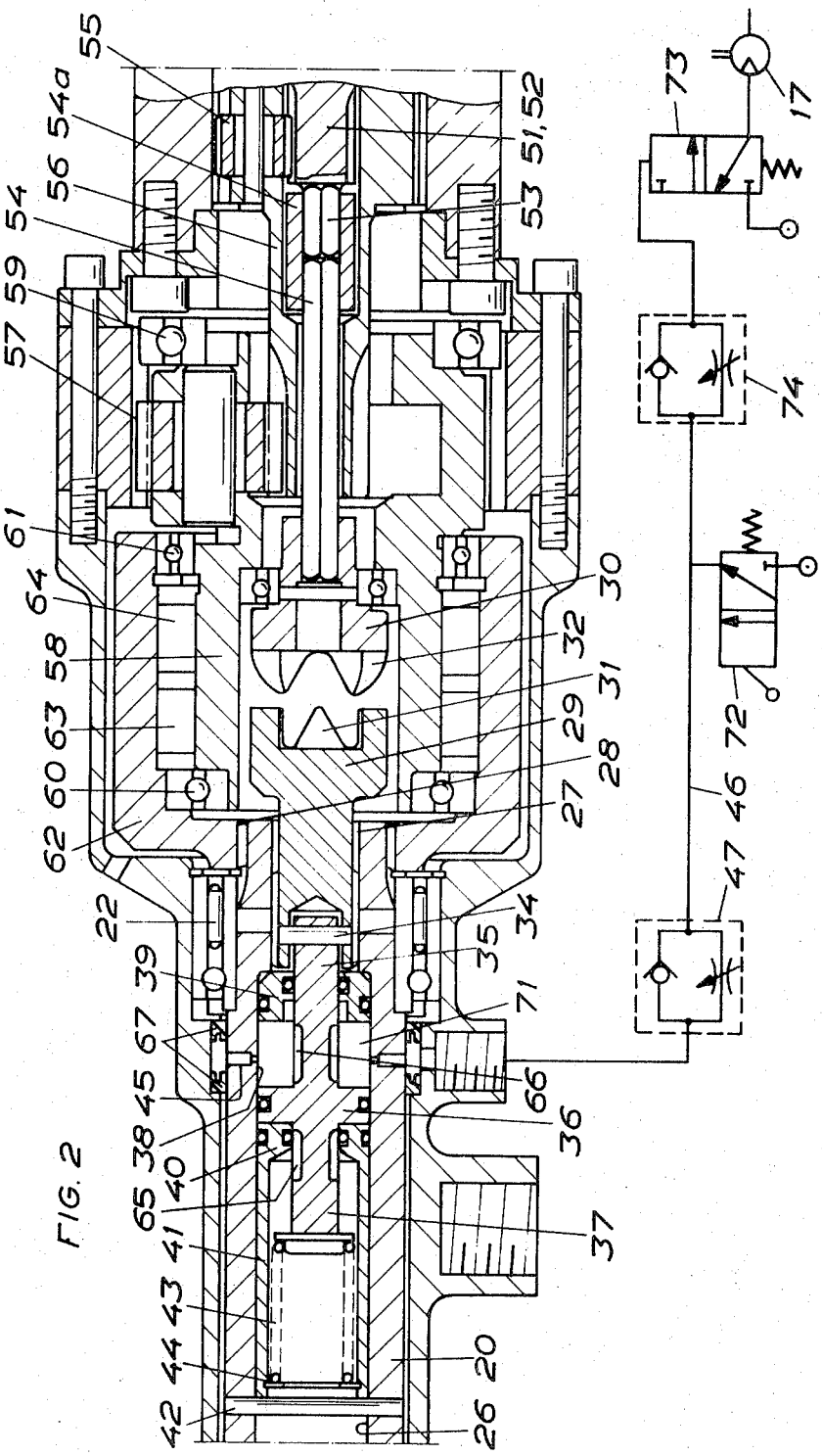
FIG. 2 shows a part of the nut runner in a longitudinal section as in FIG. 1 but at a larger scale and with some details in another relative position. In this figure a modified supply system is shown schematically.

The driven clutch member 29 projects with a splined portion 33 into the internal splines 27 of the output shaft, and thereby it is axially slidably coupled to the output shaft 20 but non-rotatable relative thereto. By means of a locking pin 34, the clutch member 29 is attached to a rear piston rod 35 of a piston 36 that has a forward directed piston rod 37 as well. The piston 36 is slidable in a cylinder 38 that is formed by a portion of the bore 26 of the output shaft 20. The cylinder 38 has a rear end wall 39 through which the rear piston rod 35 slidably extends and a forward end wall 40 through which the forward piston rod 37 slidably extends. Thus, the piston or piston head 36 divides the cylinder 38 into a forward cylinder chamber 70 (FIG. 1) and a rear cylinder chamber 71 (FIG. 2). The forward end wall 40 is part of a sleeve 41 that abuts against a pin 42. A coil spring 43 takes support against a snap ring 44 in the sleeve 41 and applies a load on the piston rod 37 so that the driven clutch member 29 is biased toward its engaged position in which it is shown in FIG. 1 when both the cylinder chambers 70,71 are vented. Four radial bores 45 in the output shaft 20 end in the cylinder 38 and these bores are supplied with compressed air through a swivel joint with seals 67 from a conduit 46 with a one-way restrictor 47.

Instead of a direct acting supply valve according to FIG. 1, there is in FIG. 2 schematically shown a control valve 72, that, when manually actuated, on the one hand supplies air to the conduit 46 and on the other hand supplies control air to a supply valve 73 through a one-way restrictor 74 that delays the shifting of the supply valve 73 into its supplying position until the cylinder chamber 70 has become pressurized.

The motor 17 has a drive shaft 48 that provides a sun gear in a planet gear step 49 with planet gears 50 of the bi-gear type. The carrier 51 of the planet gears 50 provides a sun gear 52 in a second planet gear step but it has also a forward directed hexagonal end portion 53 that rotates the clutch member 30 by means of a sleeve 54a and a hexagonal shaft 54 that projects into a corresponding hexagonal recess in the clutch member 30. The planet gear step of which the sun gear 52 is part has planet gears 55 and a sleeve-like planet carrier 56 which in its turn provides a sun gear in another planet gear step with planet gears 57 and a sleeve-like planet carrier 58. The rear portion of the planet carrier 58 is journalled in the housing 11 by means of a ball bearing 59, and by means of two ball bearings 60,61 it is also journalled in an outer sleeve 62. This outer sleeve 62 is connected to the output shaft 20 by means of splines mating with the outer splines 28 of the output shaft. Between the ball bearings 60,61 there are two rows of radial clutch elements 63,64 which together with the planet carrier 58, and the sleeve 62 form a one-way clutch. Thus, this one-way clutch is a high torque clutch that automatically takes over the transmission of torque when the low torque clutch 29,30 disengages due to being overloaded.

The driving clutch member 30 of the low torque clutch 29,30 is journalled in the sleeve 58 and due to the play in the splined connection 28 between the output shaft 20 and the sleeve 62, the driving clutch member 30 of the low torque clutch will be somewhat movable radially. The driven clutch member 29 of the low torque clutch is also somewhat movable radially in its splined connection 27 and also in its coupling to the piston 35. This provides for an automatic centering of the low torque clutch 29,30 when it transmits torque.

The spring 43 holds the low torque clutch 29,30 engaged when there is no air supplied to the nut runner. When the supply valve 19 in FIG. 1 is actuated, the air will flow through the conduit 46 and the bores 45 to the cylinder chamber 70 to cooperate with the spring 43 simultaneously with air being supplied to the motor 17. When, in the alternative supply arrangement shown in FIG. 2, the control valve 72 is instead actuated, the cylinder chamber 70 will become pressurized shortly before the motor 17 is supplied with air. The low torque clutch 29,30 will rotate the output shaft 20 during the running-down operation while the clutch members 63,64 of the one-way clutch permits the outer sleeve 62 to co-rotate with the output shaft 20 faster than the interior clutch sleeve 58 rotates.

The torque transmitted through the low torque clutch 29,30 results in an axial force on the clutch member 29 due to the inclined interfacing surfaces of the dogs 31,32, and, at a certain torque, this axial force overcomes the opposite-directed force applied by the piston rod 35 so that the clutch member 29 is forced forwardly. The piston 36 is forced to move conjointly with the clutch member 29. In this movement, the piston 36 passes the bores 45 so that air is supplied to the cylinder chamber 71 instead of to the cylinder chamber 70 and two axial grooves 65 in the forward piston rod 37 start to vent the cylinder chamber 70. As a result, the air pressure in the cylinder chamber 71 at the rear of the piston overcomes the spring 43 and forces the piston 36 into its forward end-position in which it is shown in FIG. 2, and the piston 36 pulls the driven clutch member 29 completely out of engagement with the driving clutch member 30 and retains it there. The one-way clutch 63,64 takes over the torque transmission automatically at a rotary speed that can be for instance a few percent of the rotary speed of the clutch member 30. This geared-down speed provides for a very high maximum torque.

The final torque is controlled by means of a non-illustrated pressure regulator in the supply hose 18 and the final torque is achieved when the motor stalls out. Then, when the supply air is interrupted, the cylinder chamber 71 is vented slowly through the one-way restrictor 47 so that the spring 43 can return the clutch member 29 into its engaged position. During this return movement of the piston 36, the bores 45 become isolated from the cylinder chamber 71, and this cylinder chamber 71 becomes vented through to axial vent grooves 66 in the rear piston rod 35. The one-way restrictor 47 ensures that the torque on the output shaft 20 has been reduced before the reengagement of the low torque clutch 29,30 so that the nut runner will always be easy to remove. When removed from the nut just tightened, the nut runner is immediately ready for running down and tightening another nut,

What we claim is:

1. A torque controlled nut runner comprising:
a fluid motor;
a driving shaft coupled to said fluid motor;
an output shaft connected to be rotated by said fluid motor on the one hand through a low torque clutch of the kind that disengages when the torque transmitted therethrough reaches a pre-determined value and on the other hand through a gearing and a one-way clutch that automatically takes over the transmission of torque when the low torque clutch disengages;
said low torque clutch including a driving clutch member connected to co-rotate with said driving shaft and a driven clutch member connected to co-rotate with said output shaft, one of said clutch members being axially movable relative to its associated shaft between a position in which it is engaged with the other of said clutch members and a disengaged position;
a cylinder formed within the shaft that is associated with said movable clutch member;
a piston axially movably mounted within said shaft cylinder and defining a cylinder chamber with said cylinder, said piston being coupled to said movable clutch member so as to positively hold said movable clutch member disengaged when said cylinder chamber is pressurized; and
means coupled to said cylinder chamber for pressurizing said cylinder chamber in response to a disengaging movement of said movable clutch member in response to the torque reaching said predetermined value.

2. A nut runner as defined in claim 1 in which said cylinder is formed in said output shaft and said piston is disposed inside said cylinder in said output shaft; and said driven clutch member has a forward directed portion that projects axially slidably into said output shaft to form a torque transmitting joint therewith.

3. A nut runner as defined in claim 2 including a pressurized passage ending in said cylinder and in which said piston is arranged to isolate said passage from said cylinder chamber when said driven clutch member is engaged with said driving clutch member, said piston being further arranged to open said pressurized passage to said cylinder chamber when forced forwardly by the driven clutch member as the latter moves forwardly in response to the torque reaching said predetermined value.

4. A nut runner as defined in claim 3 in which said piston has a piston head having a rear piston surface adjacent said cylinder chamber and a forward piston surface adjacent a second cylinder chamber, said passage being open to said second pressure chamber when the driven clutch member is in its engaged position, whereby said driven clutch member is forced rearwardly as a result of the air pressure in said second pressure chamber.

5. A nut runner as defined in claim 4 in which said piston has a first piston rod projecting rearwardly through a first end wall of said cylinder and a second piston rod projecting forwardly through a second end wall of said cylinder, said piston rods having grooves for venting said pressure chambers alternately with said passage pressurizing the pressure chambers in response to the axial position of said piston.

6. A nut runner as defined in claim 2 in which a spring is arranged to load the driven clutch member rearwardly.

7. A nut runner as defined in claim 6 in which said spring is disposed inside said output shaft to load said piston rearwardly.

8. A nut runner as defined in claim 1 wherein said clutch members each have dogs projecting therefrom, said dogs having inclined interfacing surfaces which intermesh at torque levels below a predetermined torque, and which slide relative to each other toward disengagement thereof when the torque exceeds said predetermined torque.

9. A nut runner as defined in claim 1 wherein said piston is spring biased in a direction to maintain said clutch members in an engaged position when the torque level is below said predetermined value.

10. A nut runner as defined in claim 2 wherein said piston is spring biased in a direction to maintain said clutch members in an engaged position when the torque level is below said predetermined value.

11. A nut runner as defined in claim 6 in which said piston has axial grooves therein to vent a portion of the cylinder during movement of said piston in response to a disengaging movement of said movable clutch member.

* * * * *